(12) United States Patent
Akinlua et al.

(10) Patent No.: US 11,572,113 B2
(45) Date of Patent: Feb. 7, 2023

(54) FABRICATED TRACK ROLLER RIM ASSEMBLY

(71) Applicant: Caterpillar Inc., Peoria, IL (US)

(72) Inventors: Temitope O. Akinlua, Peoria, IL (US); Brice James Herbers, Peoria, IL (US); Scott H. Magner, Dunlap, IL (US); Michael Stephen Galat, Peoria, IL (US); Brian B. Umbach, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 453 days.

(21) Appl. No.: 16/774,243

(22) Filed: Jan. 28, 2020

(65) Prior Publication Data
US 2021/0229761 A1 Jul. 29, 2021

(51) Int. Cl.
*B62D 55/14* (2006.01)
*B62D 55/15* (2006.01)

(52) U.S. Cl.
CPC ........... *B62D 55/145* (2013.01); *B62D 55/15* (2013.01)

(58) Field of Classification Search
CPC ...... B62D 55/00; B62D 55/14; B62D 55/145; B62D 55/15; B62D 65/00; B62D 65/06
USPC ...................................................... 305/137
See application file for complete search history.

(56) References Cited

U.S. PATENT DOCUMENTS

| 3,154,958 | A | 11/1964 | Cadwell et al. |
| 3,917,362 | A | 11/1975 | Stedman |
| 8,540,325 | B2 | 9/2013 | Diekevers et al. |
| 8,827,383 | B2 | 9/2014 | Simula |
| 8,979,219 | B2 * | 3/2015 | Hisamatsu ............ B62D 55/15 305/136 |
| 9,555,845 | B2 | 1/2017 | Kita |
| 9,694,862 | B2 * | 7/2017 | Schierschmidt ....... B62D 55/06 |
| 9,745,005 | B2 * | 8/2017 | Johannsen ........... B62D 55/088 |
| 10,023,251 | B2 * | 7/2018 | Recker ................... B62D 55/15 |
| 10,227,099 | B2 | 3/2019 | Johannsen |

FOREIGN PATENT DOCUMENTS

| EP | 1088748 | 4/2001 |
| GB | 2295995 | 6/1996 |
| JP | 09109601 A | 4/1997 |
| WO | 0164503 | 9/2001 |

* cited by examiner

*Primary Examiner* — Nathan Cumar
(74) *Attorney, Agent, or Firm* — Harrity & Harrity LLP

(57) ABSTRACT

A track roller rim is disclosed. The track roller rim may include an outer member including an annular configuration defining an axis of rotation, a radial direction, and a circumferential direction disposed about the axis of rotation, where the outer member has an inner circumference, an outer circumference, a first axial end disposed along the axis of rotation, and a second axial end disposed along the axis of rotation. The track roller rim may include a first annular inner member, where the first annular inner member is interference fit within the inner circumference of the outer member at the first axial end. The track roller rim may include a second annular inner member, where the second annular inner member is interference fit within the inner circumference of the outer member at the second axial end.

20 Claims, 10 Drawing Sheets

FABRICATED TRACK ROLLER RIM ASSEMBLY

TECHNICAL FIELD

The present disclosure relates generally to track roller rims for endless track drives and, for example, to fabricated track roller rim assemblies for endless track drives.

BACKGROUND

Track roller rims for heavy equipment (e.g., an excavator and/or the like) may be manufactured by forging two half rims and then welding the half rims together. However, the forging process is complex and expensive, and the welding process requires welding equipment, which is also expensive and may not be readily available in some countries, geographic regions, jobsites, and/or the like.

One attempt to design a track roller is disclosed in U.S. Pat. No. 9,555,845 that issued to Komatsu Ltd. on Jan. 31, 2017 ("the '845 patent"). In particular, the '845 patent discloses a roller device including a shaft, a bushing, a roller shell, a retainer, and a seal. The roller shell is fitted over the outer circumference of the bushing. The retainer is fixed detachably to an end of the bushing, and fitted in an end of the roller shell on a radially outer side. The retainer is fixed to the bushing by a plurality of fixing members (bolts).

Since the outer portion of the roller device of the '845 patent is fixed in place by bolts, the roller device may fail under impact forces on the outer portion caused by the weight of heavy equipment on the track, and/or loosen due to vibrations in the track.

The track roller rim of the present disclosure solves one or more of the problems set forth above and/or other problems in the art.

SUMMARY

According to some implementations, a track roller rim may include an outer member including an annular configuration defining an axis of rotation, a radial direction, and a circumferential direction disposed about the axis of rotation, wherein the outer member has an inner circumference, an outer circumference, a first axial end disposed along the axis of rotation, and a second axial end disposed along the axis of rotation; a first annular inner member, wherein the first annular inner member is interference fit within the inner circumference of the outer member at the first axial end; and a second annular inner member, wherein the second annular inner member is interference fit within the inner circumference of the outer member at the second axial end.

According to some implementations, a track roller rim may include an outer member including an annular configuration defining an axis of rotation, a radial direction, and a circumferential direction disposed about the axis of rotation, wherein the outer member comprises: a roller tread having an inner circumference, an outer circumference, a first axial end disposed along the axis of rotation, and a second axial end disposed along the axis of rotation; a first flange on the outer circumference of the roller tread at the first axial end; and a second flange on the outer circumference of the outer member at the second axial end; a first annular inner member, wherein the first annular inner member is interference fit within the inner circumference of the roller tread at the first axial end; and a second annular inner member, wherein the second annular inner member is interference fit within the inner circumference of the roller tread at the second axial end.

According to some implementations, a roller tread may include an outer member including an annular configuration defining an axis of rotation, a radial direction, and a circumferential direction disposed about the axis of rotation, wherein the outer member comprises: a roller tread having an inner circumference, an outer circumference, a first axial end disposed along the axis of rotation, a second axial end disposed along the axis of rotation, and a central portion between the first axial end and the second axial end; and a central flange on the outer circumference of the roller tread in the central portion; a first annular inner member, wherein the first annular inner member is interference fit within the inner circumference of the roller tread at the first axial end; and a second annular inner member, wherein the second annular inner member is interference fit within the inner circumference of the roller tread at the second axial end.

DETAILED DESCRIPTION

This disclosure relates to a track roller. The track roller has universal applicability to any machine utilizing such a track roller. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment.

Figure 1:
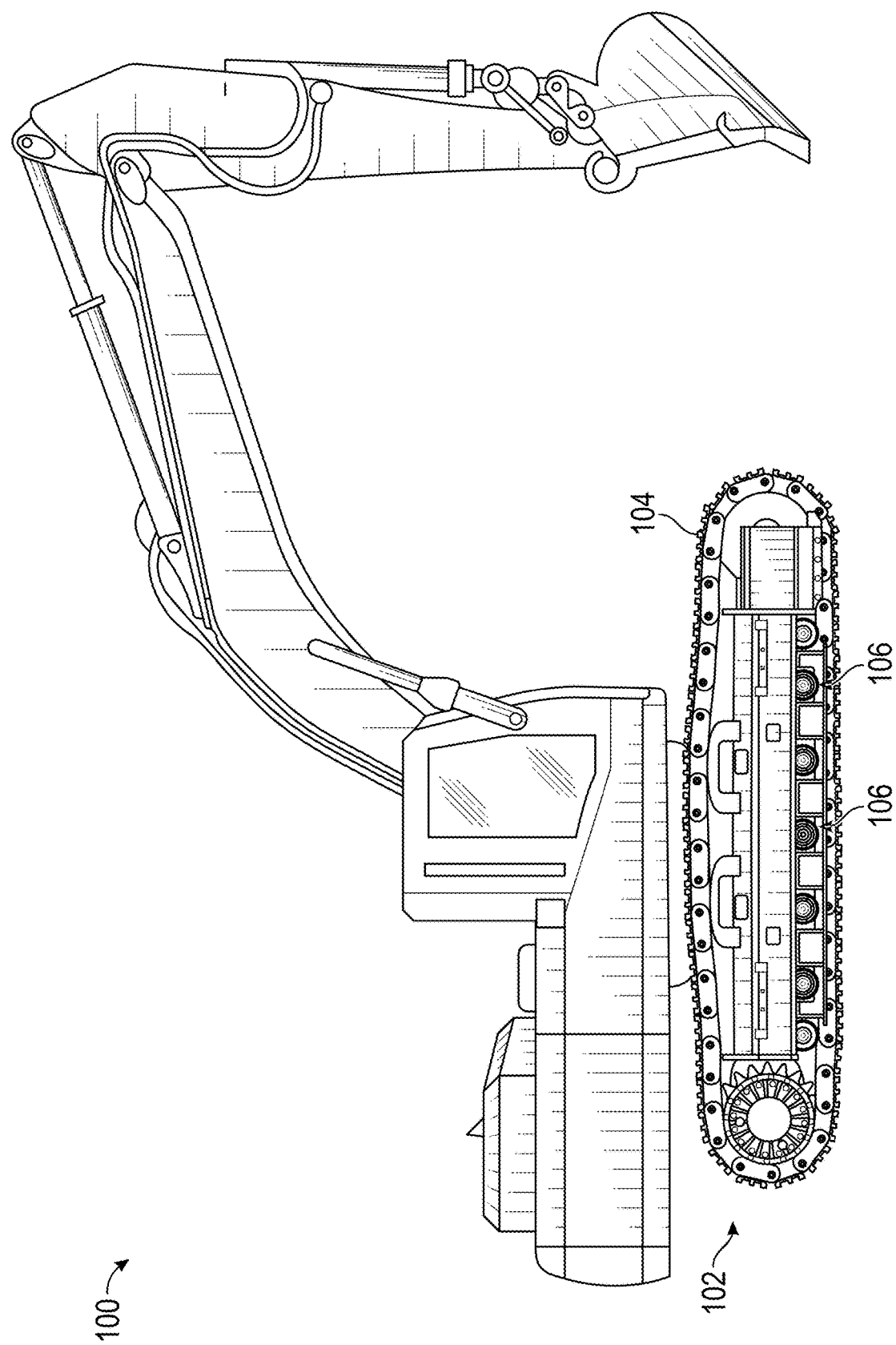
FIG. 1 is a diagram of an example machine that includes an undercarriage assembly.

FIG. 1 is a diagram of an example machine 100 that includes an undercarriage assembly 102. As shown in FIG. 1, the example machine 100 is an excavator that includes an undercarriage assembly 102 with a track assembly 104 and track roller assemblies 106. The undercarriage assembly 102 may be configured to support the example machine 100 and move the example machine 100 along the ground, road, other types of terrain, and/or the like.

Figure 2:
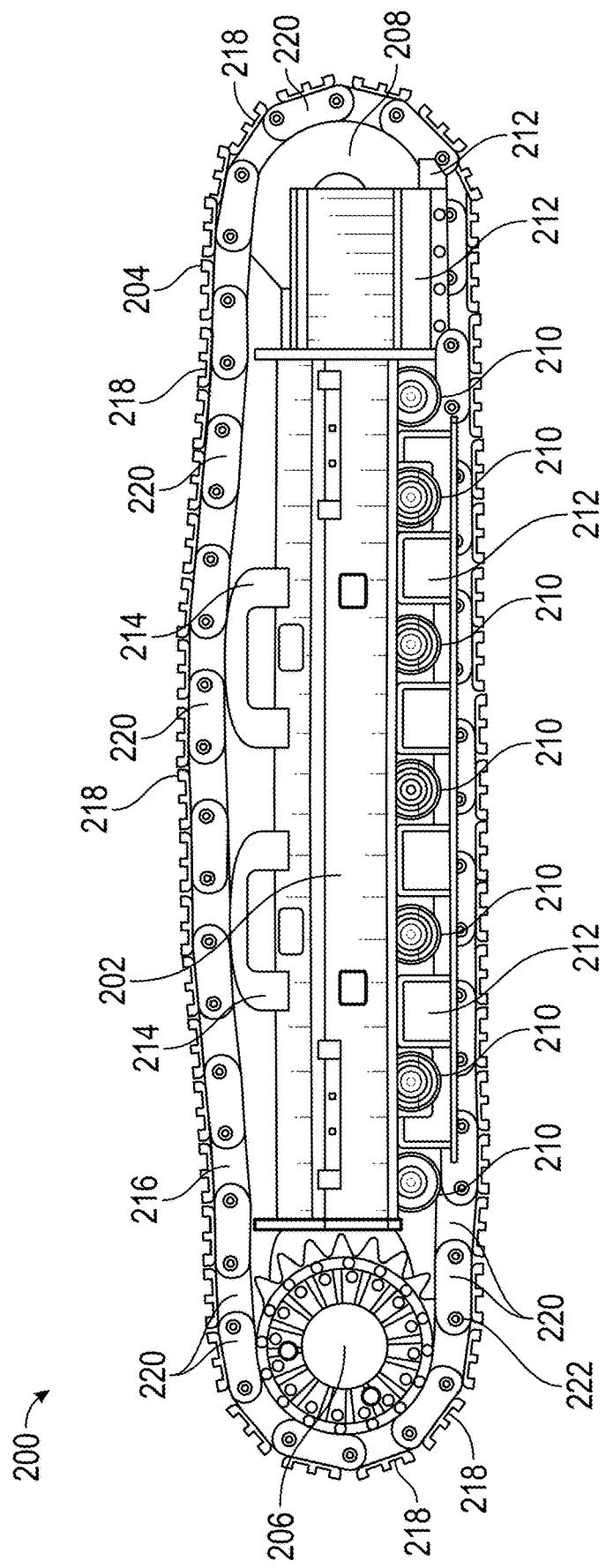
FIG. 2 is a side view of an example undercarriage assembly that may be used with the example machine of FIG. 1.
Figure 3:
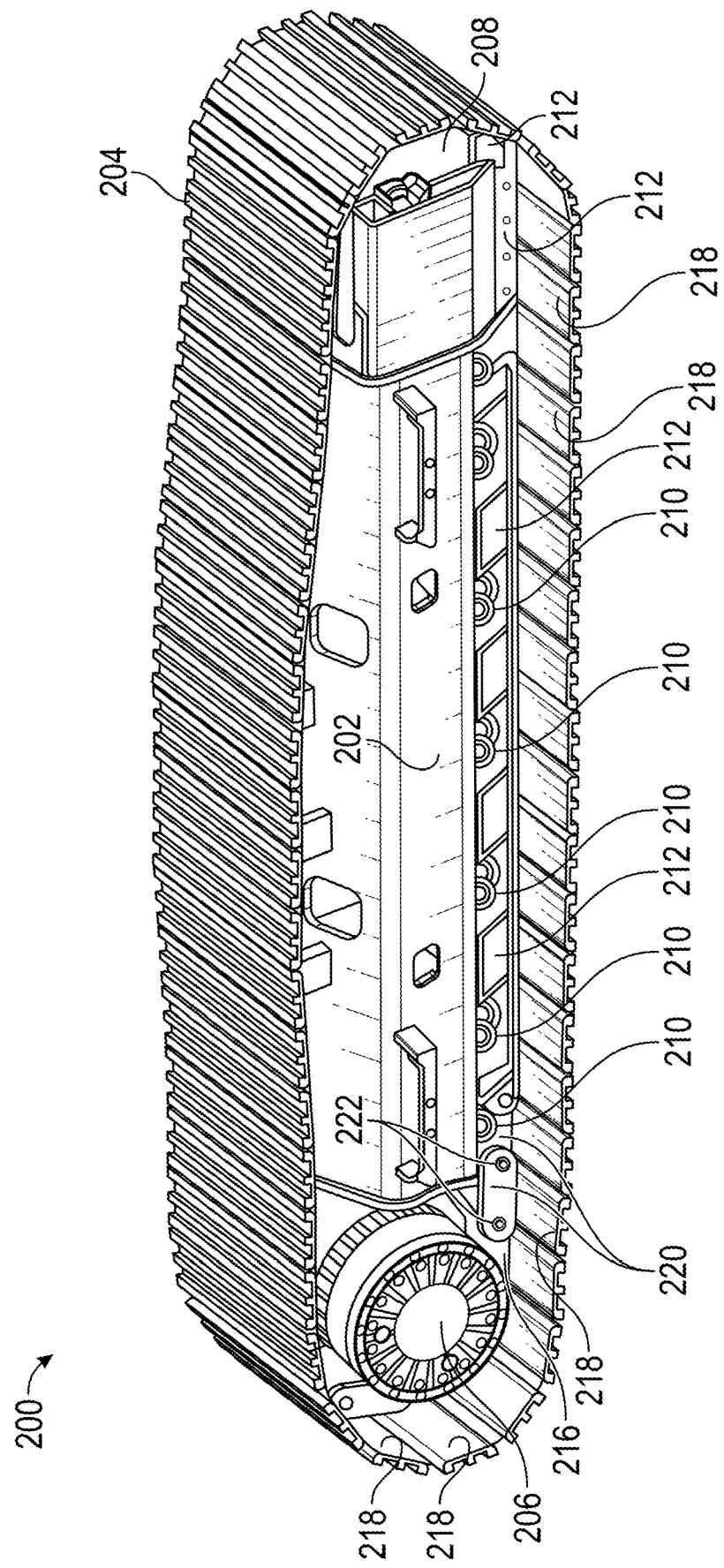
FIG. 3 is a perspective view of the example undercarriage assembly of FIG. 2.

FIG. 2 is a side view of an example undercarriage assembly 200 that may be used with the example machine 100 of FIG. 1, and FIG. 3 is a perspective view of the example undercarriage assembly 200 of FIG. 2. As shown in FIGS. 2 and 3, the example undercarriage assembly 200 may include a track roller frame 202, guiding components connected to the track roller frame 202, and a track 204 engaging the guiding components. The guiding components may guide the track 204 and may include a drive sprocket 206, an idler 208, track roller assemblies 210, track guides 212, carriers 214, and/or the like.

The track 204 may include a link assembly 216 with a plurality of track shoes 218 secured thereto. The link assembly 216 may form a flexible backbone of the track 204, and the track shoes 218 may provide traction on various types of terrain. Pins 222 may join pairs of links 220 to form the link assembly 216, and the link assembly 216 may extend in a chain around the drive sprocket 206, the track roller assemblies 210, the idler 208, and the carriers 214.

The track shoes 218 may be secured to the perimeter of link assembly 216. For example, one track shoe 218 may be attached to each laterally spaced pair of links 220. The track shoes 218 may be connected to the links 220 via various methods (e.g., welding, fastening, and/or the like).

Figure 4:
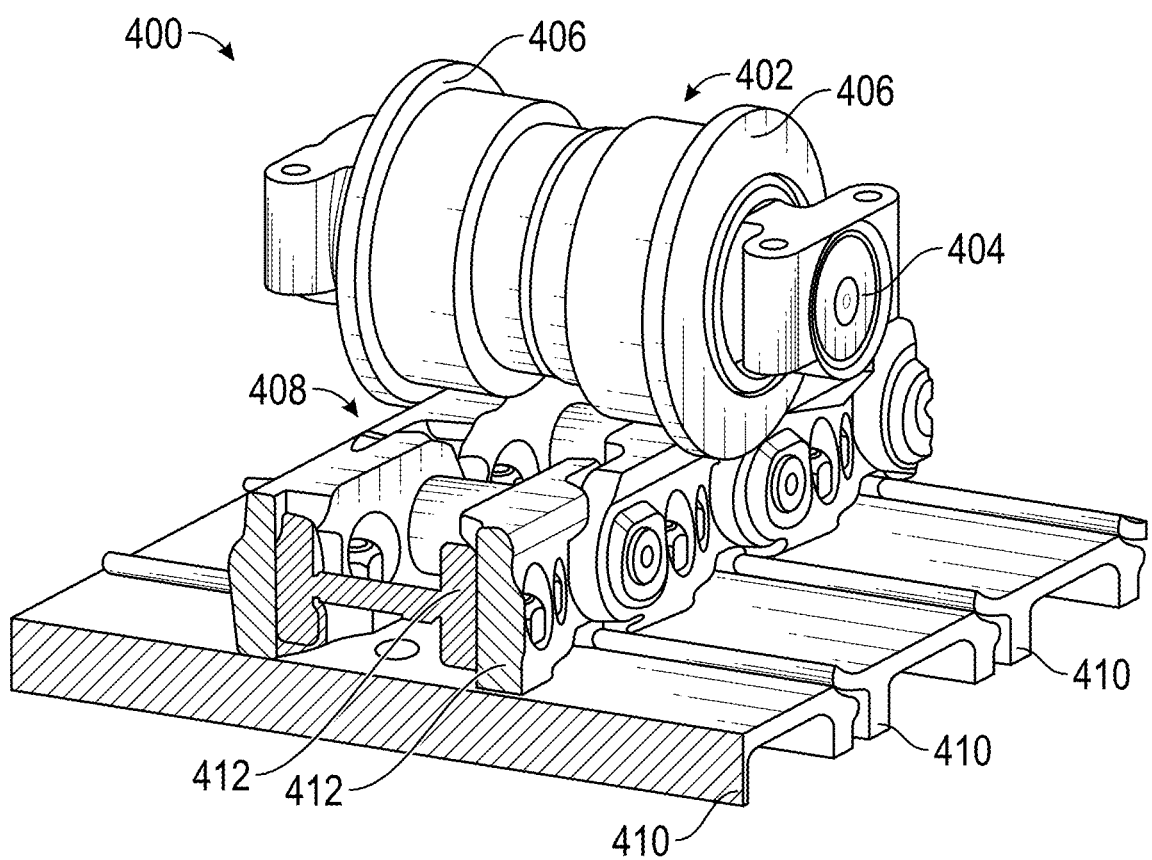
FIG. 4 is a perspective view of an example track roller assembly coupling with a portion of an example track.

FIG. 4 is a perspective view of an example track roller assembly 400 coupling with a portion of an example track. As shown in FIG. 4, the example track roller assembly 400 may include a track roller rim 402 and a shaft 404 extending through the track roller rim 402. The shaft 404 may extend from a track roller frame of an undercarriage assembly (e.g., the track roller frame 202 of the example undercarriage assembly 200 shown in FIGS. 2 and 3, and/or the like) through the track roller rim 402.

As shown in FIG. 4, the track may include a link assembly 408 (e.g., similar to the link assembly 216 shown in FIGS. 2 and 3, and/or the like), track shoes 410 (e.g., similar to the track shoes 218 shown in FIGS. 2 and 3, and/or the like), and links 412 (e.g., similar to the links 220 shown in FIGS. 2 and 3, and/or the like). The track roller rim 402 may couple with the link assembly 408, for example, by contacting the links 412. As shown in FIG. 4, the track roller rim 402 may include outer flanges 406 to maintain positioning of the links 412 on the track roller rim 402 between the outer flanges 406. For example, and as shown in FIG. 4, the outer flanges 406 may maintain positioning of the links 412 on the track roller rim 402 by contacting outer faces of the links 412.

Figure 5:
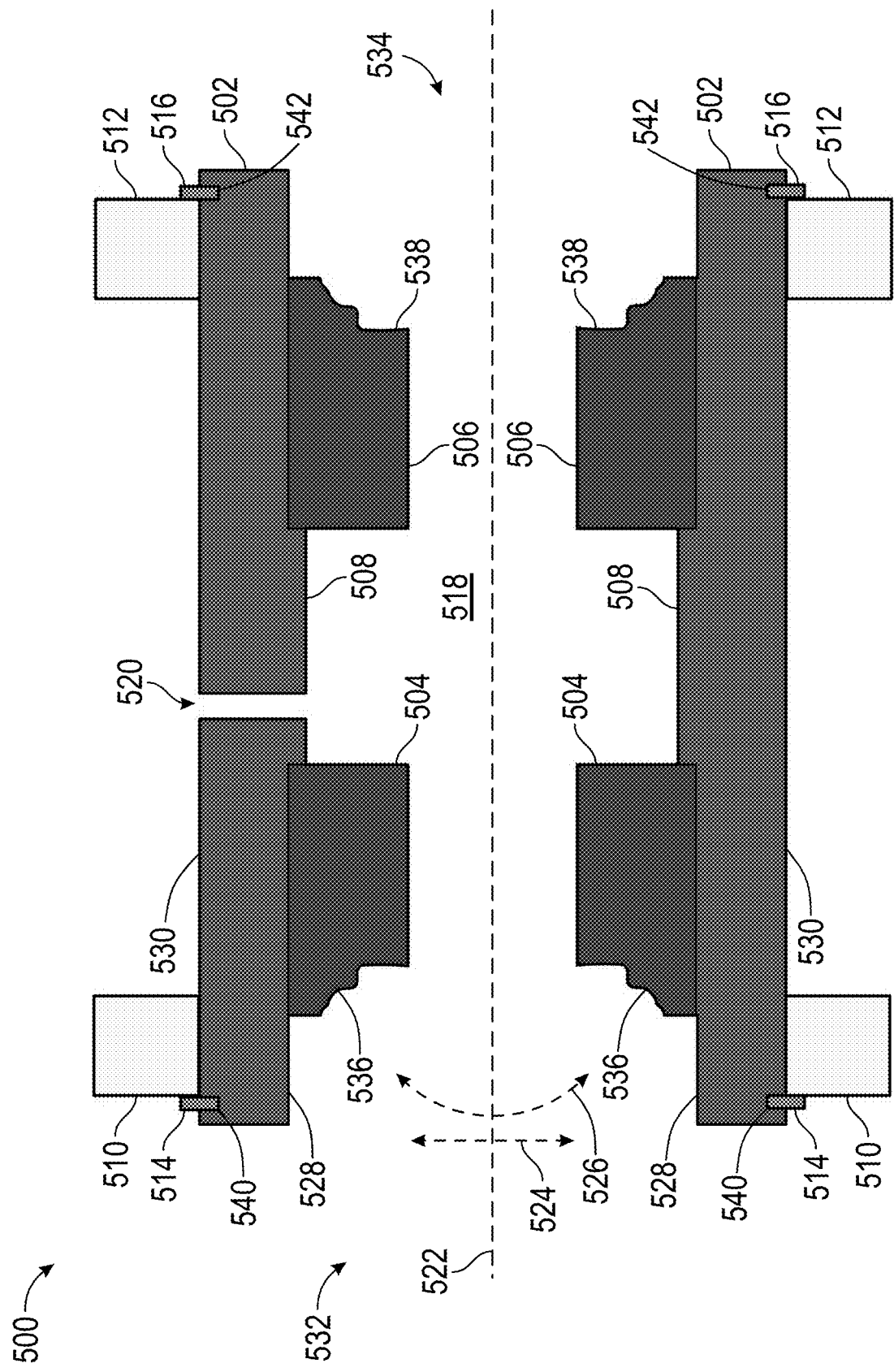
FIGS. 5-9 are diagrams of cross-sectional views of example track roller rims as described herein.

FIG. 5 is a diagram of a cross-sectional view of an example track roller rim 500 as described herein. As shown in FIG. 5, the example track roller rim 500 may include a roller tread 502 (e.g., an outer member), a first annular inner member 504, a second annular inner member 506, an inner tab 508, a first flange 510, a second flange 512, a first retaining ring 514, a second retaining ring 516, an oil cavity 518, and a hole 520. The example track roller rim 500 and/or the roller tread 502 may include an annular configuration defining an axis of rotation 522, a radial direction 524, and a circumferential direction 526 disposed about the axis of rotation 522.

As shown in FIG. 5, the roller tread 502 may have an inner circumference 528, an outer circumference 530, a first axial end 532 disposed along the axis of rotation 522, and a second axial end 534 disposed along the axis of rotation 522. The roller tread 502 may be formed from tube stock steel, machined tube stock steel, and/or the like.

As shown in FIG. 5, the first annular inner member 504 may be interference fit (e.g., press fit and/or the like) within the inner circumference 528 of the roller tread 502 at the first axial end 532. The second annular inner member 506 may be interference fit within the inner circumference 528 of the roller tread 502 at the second axial end 534.

The first annular inner member 504 and/or the second annular inner member 506 may each include a face 536, 538. As shown in FIG. 5, the first annular inner member 504 includes a face 536 oriented toward the first axial end 532.

Similarly, and as shown in FIG. 5, the second annular inner member 506 includes a face 538 oriented toward the second axial end 534. The first annular inner member 504 and/or the second annular inner member 506 may be formed from tube stock steel and/or the like and the faces 536, 538 may be machined into the tube stock steel.

The faces 536, 538 of the first annular inner member 504 and/or the second annular inner member 506 may be configured to form a seal with a collar. The seal may prevent oil within the oil cavity 518 and oil on bearings within the track roller from leaking, and may prevent intrusion of contaminants into the oil cavity 518 and onto the bearings. For example, the face 536, 538 may be configured to form a dual cone seal (e.g., with a spring member and a collar), a metal face seal, and/or the like. Polyurethane, an O-ring, and/or the like may be included to form the seal. As shown in FIG. 5, the face 536 of the first annular inner member 504 may be configured to form a dual cone seal when a spring member and collar are positioned at the first axial end 532 of the roller tread 502. Similarly, and as shown in FIG. 5, the face 538 of the second annular inner member 506 may be configured to form a dual cone seal when a spring member and collar are positioned at the second axial end 534 of the roller tread 502.

As shown in FIG. 5, the inner tab 508 may be positioned on the inner circumference 528 of the roller tread 502. For example, the inner tab 508 may be positioned on the inner circumference 528 of the roller tread 502 between the first annular inner member 504 and the second annular inner member 506. The inner tab 508 may provide a hard stop when the first annular inner member 504 and the second annular inner member 506 are interference fit within the inner circumference 528 of the roller tread 502. The inner tab 508 may provide support to the first annular inner member 504 and the second annular inner member 506 when compressive forces are applied at the first axial end 532 and/or the second axial end 534.

The roller tread 502 may include the inner tab 508. For example, the inner tab 508 may be a portion of the roller tread 502, where the portion has an increased thickness as compared to other portions of the roller tread 502. For example, the inner circumference 528 of the roller tread 502 at the first axial end 532 and the second axial end 534 may be greater than the inner circumference 528 of the roller tread 502 in a central portion of the roller tread 502, where the central portion of the roller tread 502 forms the inner tab 508. The roller tread 502 may be formed from tube stock steel and may be machined to form the inner tab 508. Additionally, or alternatively, the inner tab 508 may be formed from tube stock steel, machined tube stock steel, and/or the like and may be interference fit on the inner circumference 528 of the roller tread 502.

As shown in FIG. 5, the first flange 510 may be interference fit on the outer circumference 530 of the roller tread 502 at the first axial end 532, and the second flange 512 may be interference fit on the outer circumference 530 of the roller tread 502 at the second axial end 534. The first flange 510 and the second flange 512 may be formed from tube stock steel and/or the like. The first flange 510 and the second flange 512 may maintain positioning of links on the example track roller rim 500 between the first flange 510 and the second flange 512 in a manner similar to that described with respect to the outer flanges 406 shown in FIG. 4.

As shown in FIG. 5, the first retaining ring 514 may be positioned on the outer circumference 530 of the roller tread 502 between the first flange 510 and the first axial end 532. Similarly, the second retaining ring 516 may be positioned on the outer circumference 530 of the roller tread 502 between the second flange 512 and the second axial end 534. The first retaining ring 514 and/or the second retaining ring 516 may be formed from tube stock steel, machined tube stock steel, and/or the like. The first retaining ring 514 and/or the second retaining ring 516 may be interference fit on the outer circumference 530 of the roller tread 502.

The first retaining ring 514 may provide support to the first flange 510 when forces are applied to the first flange 510 (e.g., by links of a track assembly positioned between the first flange 510 and the second flange 512 and/or the like). Similarly, the second retaining ring 516 may provide support to the second flange 512 when forces are applied to the second flange 512 (e.g., by links of a track assembly positioned between the first flange 510 and the second flange 512 and/or the like).

As shown in FIG. 5, the roller tread 502 may include a groove 540, 542 (e.g., a notch, an opening, and/or the like) on the outer circumference 530 at each of the first axial end 532 and the second axial end 534 to receive the first retaining ring 514 and the second retaining ring 516, respectively. For example, the roller tread 502 may be formed from tube stock steel, and the groove 540, 542 may be machined into the tube stock steel. Each groove 540, 542 may increase friction between the outer circumference 530 of the roller tread 502 and each of the first retaining ring 514 and the second retaining ring 516, which may increase support provided to the first flange 510 and the second flange 512.

As shown in FIG. 5, the oil cavity 518 may be formed by the roller tread 502 (e.g., the inner circumference 528 of the roller tread 502), the first annular inner member 504, and the second annular inner member 506. When the example track roller rim 500 is assembled into a track roller assembly (e.g., similar to the example track roller assembly 400 of FIG. 4), a bearing may be interference fit onto each of the first annular inner member 504 and the second annular inner member 506, and a shaft (e.g., similar to shaft 404 of FIG. 4) may be inserted along the axis of rotation 522, such that the oil cavity 518 may provide oil to the bearings.

As shown in FIG. 5, the hole 520 may be in fluid communication with the oil cavity 518 such that oil may be provided, via the hole 520, from outside the example track roller rim 500 to the oil cavity 518. The hole 520 may be formed in the roller tread 502 (e.g., via machining, via a drill, and/or the like).

Figure 6:
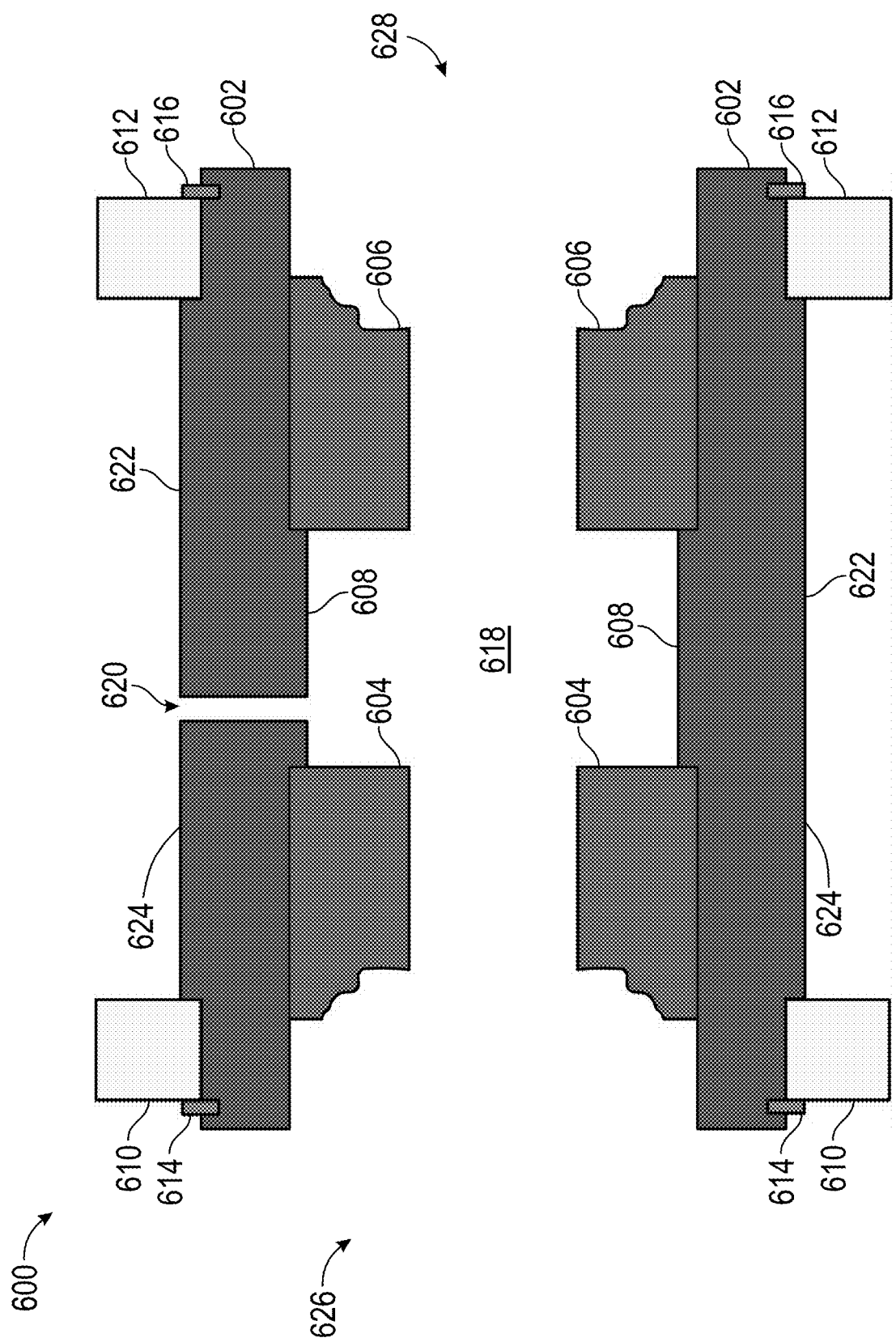

FIG. 6 is a diagram of a cross-sectional view of an example track roller rim 600 as described herein. As shown in FIG. 6, the example track roller rim 600 may include a roller tread 602 (e.g., an outer member), a first annular inner member 604, a second annular inner member 606, an inner tab 608, a first flange 610, a second flange 612, a first retaining ring 614, a second retaining ring 616, an oil cavity 618, a hole 620, and an outer tab 622.

The example track roller rim 600 may be similar to the example track roller rim 500 shown in FIG. 5, but the example track roller rim 600 may include the outer tab 622. For example, the example track roller rim 600 and/or the roller tread 602 may include an annular configuration defining an axis of rotation, a radial direction, and a circumferential direction disposed about the axis of rotation similar to the annular configuration, the axis of rotation 522, the radial direction 524, and the circumferential direction 526 as described herein with respect to FIG. 5. The roller tread 602, the first annular inner member 604, the second annular inner member 606, the inner tab 608, the first flange 610, the second flange 612, the first retaining ring 614, the second retaining ring 616, the oil cavity 618, and the hole 620 of the example track roller rim 600 may be respectively similar to the roller tread 502, the first annular inner member 504, the second annular inner member 506, the inner tab 508, the first flange 510, the second flange 512, the first retaining ring 514, the second retaining ring 516, the oil cavity 518, and the hole 520 as described herein with respect to FIG. 5.

As shown in FIG. 6, the outer tab 622 may be positioned on the outer circumference 624 of the roller tread 602. For example, the outer tab 622 may be positioned on the outer circumference 624 of the roller tread 602 between the first flange 610 and the second flange 612. The outer tab 622 may provide a hard stop when the first flange 610 and the second flange 612 are interference fit on the outer circumference 624 of the roller tread 602. The outer tab 622 may provide support to the first flange 610 and the second flange 612 when compressive forces are applied at the first axial end 626 and/or the second axial end 628.

The roller tread 602 may include the outer tab 622. For example, the outer tab 622 may be a portion of the roller tread 602, where the portion has an increased thickness as compared to other portions of the roller tread 602. For example, the outer circumference 624 of the roller tread 602 at the first axial end 626 and the second axial end 628 may be less than the outer circumference 624 of the roller tread 602 in a central portion of the roller tread 602, where the central portion of the roller tread 602 forms the outer tab 622. The roller tread 602 may be formed from tube stock steel and may be machined to form the outer tab 622. Additionally, or alternatively, the outer tab 622 may be formed from tube stock steel, machined tube stock steel, and/or the like and may be interference fit on the outer circumference 624 of the roller tread 602.

Figure 7:
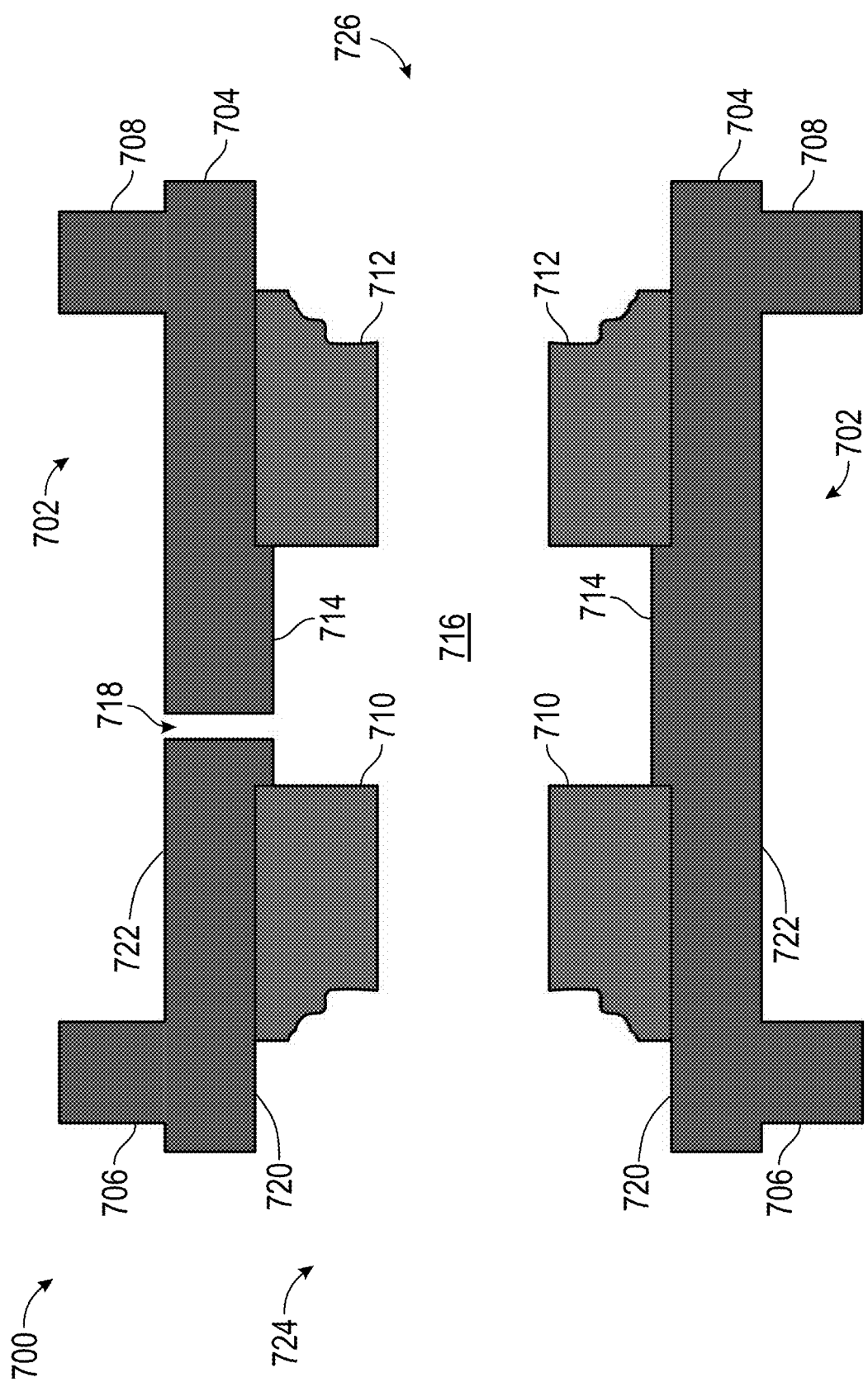

FIG. 7 is a diagram of a cross-sectional view of an example track roller rim 700 as described herein. As shown in FIG. 7, the example track roller rim 700 may include an outer member 702, a roller tread 704, a first flange 706, a second flange 708, a first annular inner member 710, a second annular inner member 712, an inner tab 714, an oil cavity 716, and a hole 718.

The example track roller rim 700 may be similar to the example track roller rim 500 shown in FIG. 5, but the example track roller rim 700 may include the outer member 702, which includes the roller tread 704, the first flange 706, the second flange 708, and the inner tab 714. For example, the example track roller rim 700, the outer member 702, and/or the roller tread 704 may include an annular configuration defining an axis of rotation, a radial direction, and a circumferential direction disposed about the axis of rotation similar to the annular configuration, the axis of rotation 522, the radial direction 524, and the circumferential direction 526 as described herein with respect to FIG. 5.

As shown in FIG. 7, the outer member 702 may include the roller tread 704, the first flange 706, the second flange 708, and the inner tab 714. The outer member 702 may be formed from ring rolled forged steel and/or upset forged steel, and the outer member 702 may be a single element including the roller tread 704, the first flange 706, the second flange 708, and the inner tab 714. The roller tread 704 may have an inner circumference 720, an outer circumference 722, a first axial end 724 disposed along the axis of rotation, and a second axial end 726 disposed along the axis of rotation.

As shown in FIG. 7, the outer member 702 may include the first flange 706 and the second flange 708. For example, the outer member 702 may include the first flange 706 on the outer circumference 722 of the roller tread 704 at the first axial end 724, and may include the second flange 708 on the outer circumference 722 of the roller tread 704 at the second axial end 726. The first flange 706 and the second flange 708 may maintain positioning of links on the example track roller rim 700 between the first flange 706 and the second flange 708 in a manner similar to that described with respect to the outer flanges 406 shown in FIG. 4.

As shown in FIG. 7, the outer member 702 may include the first flange 706 and the second flange 708, such that the first flange 706 and the second flange 708 may be portions of the roller tread 704, where the portions have increased thickness as compared to other portions of the roller tread 704. For example, the outer circumference 722 of the roller tread 704 at the first axial end 724 and the second axial end 726 may be greater than the outer circumference 722 of the roller tread 704 in a central portion of the roller tread 704, where a portion of the roller tread 704 at the first axial end 724 forms the first flange 706 and a portion of the roller tread 704 at the second axial end 726 forms the second flange 708.

As shown in FIG. 7, the inner tab 714 may be positioned on the inner circumference 720 of the roller tread 704. For example, the inner tab 714 may be positioned on the inner circumference 720 of the roller tread 704 between the first annular inner member 710 and the second annular inner member 712. The inner tab 714 may provide a hard stop when the first annular inner member 710 and the second annular inner member 712 are interference fit within the inner circumference of the roller tread 704. The inner tab 714 may provide support to the first annular inner member 710 and the second annular inner member 712 when compressive forces are applied at the first axial end 724 and/or the second axial end 726.

As shown in FIG. 7, the outer member 702 may include the inner tab 714, such that the inner tab 714 may be a portion of the roller tread 704, where the portion has an increased thickness as compared to other portions of the roller tread 704. For example, the inner circumference 720 of the roller tread 704 at the first axial end 724 and the second axial end 726 may be greater than the inner circumference 720 of the roller tread 704 in a central portion of the roller tread 704, where the central portion of the roller tread 704 forms the inner tab 714.

The first annular inner member 710, the second annular inner member 712, the oil cavity 716, and the hole 718 of the example track roller rim 700 may be respectively similar to the first annular inner member 504, the second annular inner member 506, the oil cavity 518, and the hole 520 as described herein with respect to FIG. 5.

Figure 8:
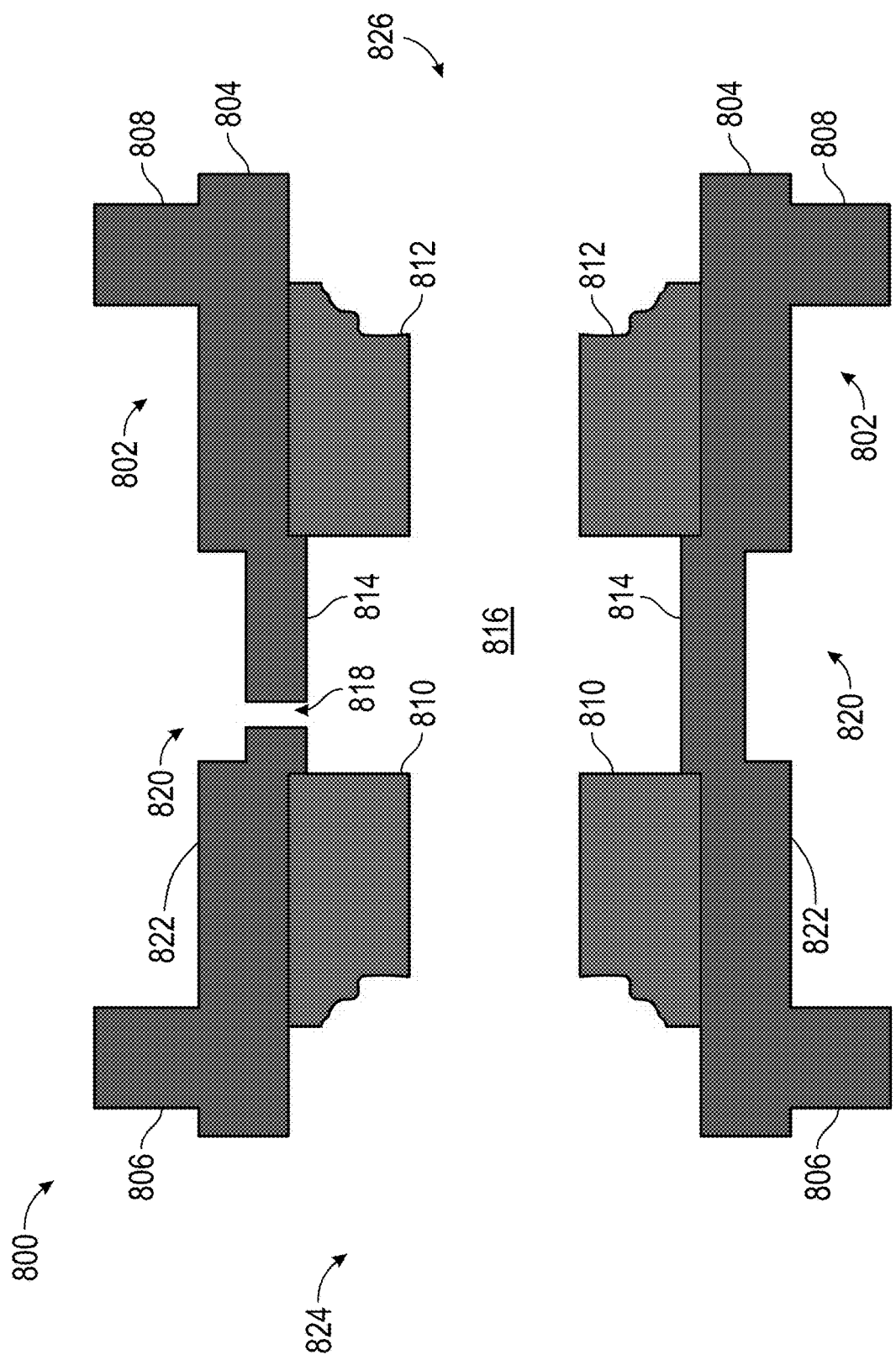

FIG. 8 is a diagram of a cross-sectional view of an example track roller rim 800 as described herein. As shown in FIG. 8, the example track roller rim 800 may include an outer member 802, a roller tread 804, a first flange 806, a second flange 808, a first annular inner member 810, a second annular inner member 812, an inner tab 814, an oil cavity 816, a hole 818, and a central portion 820. The example track roller rim 800, the outer member 802, and/or the roller tread 804 may include an annular configuration defining an axis of rotation, a radial direction, and a circumferential direction disposed about the axis of rotation similar to the annular configuration, the axis of rotation 522, the radial direction 524, and the circumferential direction 526 as described herein with respect to FIG. 5.

The example track roller rim 800 may be similar to the example track roller rim 700 shown in FIG. 7, but the example track roller rim 800 may include the central portion 820. For example, the outer member 802, the roller tread 804, the first flange 806, the second flange 808, the first annular inner member 810, the second annular inner member 812, the inner tab 814, the oil cavity 816, and the hole 818 of example track roller rim 800 may be respectively similar to the roller tread 704, the first flange 706, the second flange 708, the first annular inner member 710, the second annular inner member 712, the inner tab 714, the oil cavity 716, and the hole 718 as described herein with respect to FIG. 7.

As shown in FIG. 8, the central portion 820 may be positioned between the first annular inner member 810 and the second annular inner member 812. The central portion 820 may include a portion of the roller tread 804 in which the outer circumference 822 of the roller tread 804 is less than the outer circumference 822 of the roller tread at the first axial end 824 and the second axial end 826. For example, the central portion 820 may include a portion of the roller tread 804 having a reduced thickness as compared to other portions of the roller tread 804. The example track roller rim 800 may use less material (e.g., steel and/or the like) due to the central portion 820 and, therefore, may be less expensive to manufacture than other track roller rims. Additionally, or alternatively, having a reduced thickness in the central portion 820 may not reduce the durability, longevity, and/or the like of the example track roller rim 800 because links of a track assembly may typically contact portions of the roller tread 804 adjacent the first flange 806 and the second flange 808 (e.g., as shown in FIG. 4).

Figure 9:
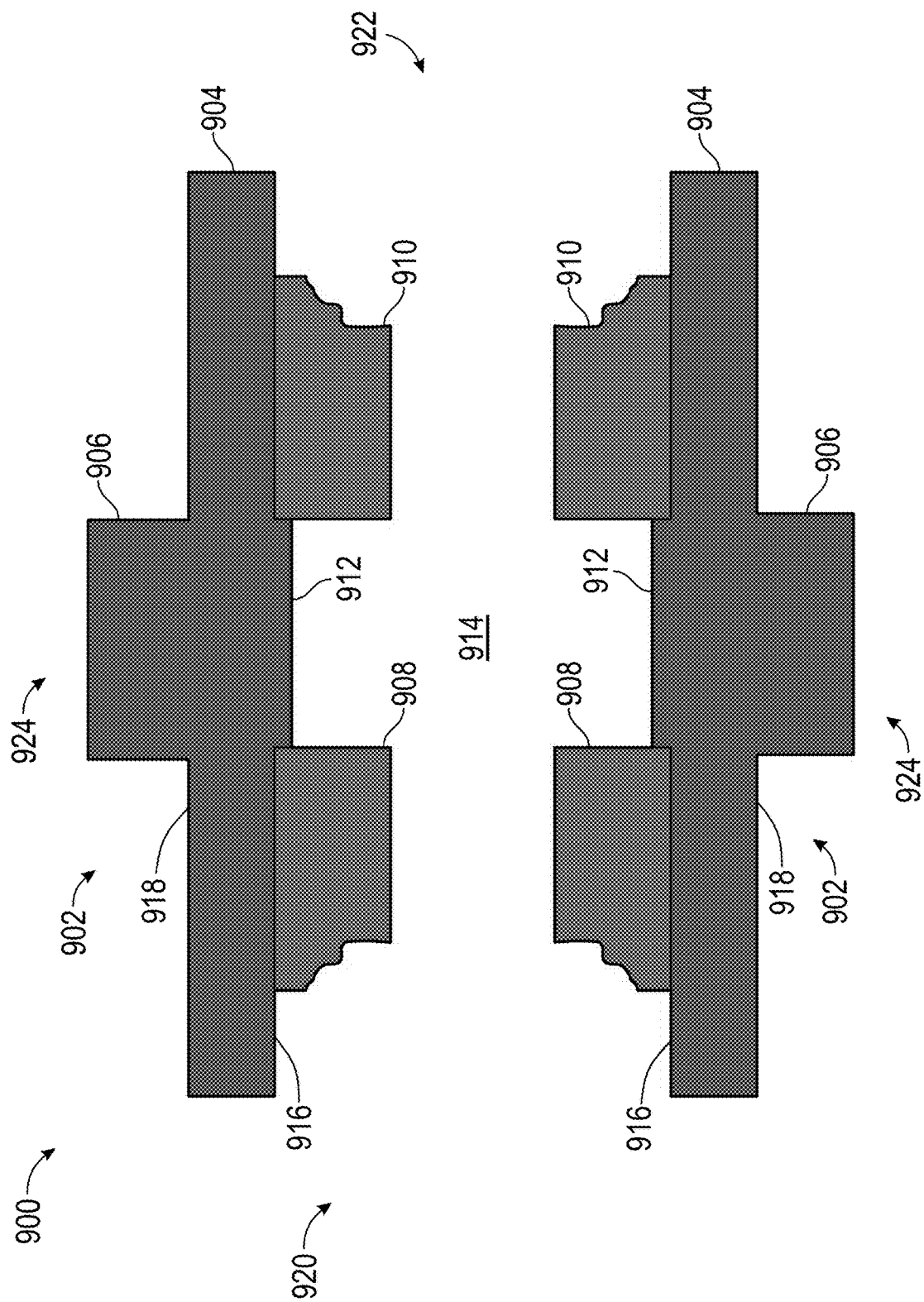

FIG. 9 is a diagram of a cross-sectional view of an example track roller rim 900 as described herein. As shown in FIG. 9, the example track roller rim 900 may include an outer member 902, a roller tread 904, a central flange 906, a first annular inner member 908, a second annular inner member 910, an inner tab 912, and an oil cavity 914. The example track roller rim 900, the outer member 902, and/or the roller tread 904 may include an annular configuration defining an axis of rotation, a radial direction, and a circumferential direction disposed about the axis of rotation similar to the annular configuration, the axis of rotation 522, the radial direction 524, and the circumferential direction 526 as described herein with respect to FIG. 5.

The example track roller rim 900 may be similar to the example track roller rim 700 shown in FIG. 7, but the example track roller rim 900 may include the central flange 906 and not include the first flange 706 and second flange 708 of example track roller rim 700. For example, the first annular inner member 908, the second annular inner member 910, the inner tab 912, and the oil cavity 914 may be respectively similar to the first annular inner member 710, the second annular inner member 712, the inner tab 714, and the oil cavity 716 as described herein with respect to FIG. 7.

As shown in FIG. 9, the outer member 902 may include the roller tread 904, the central flange 906, and the inner tab 912. The outer member 902 may be formed from ring rolled forged steel and/or upset forged steel, and the outer member 902 may be a single element including the roller tread 904, the central flange 906, and the inner tab 912. The roller tread 904 may have an inner circumference 916, an outer circumference 918, a first axial end 920 disposed along the axis of rotation, a second axial end 922 disposed along the axis of rotation, and a central portion 924 between the first axial end 920 and the second axial end 922.

As shown in FIG. 9, the outer member 902 may include the central flange 906. For example, the outer member 902 may include the central flange 906 on the outer circumference 918 of the roller tread 904 in the central portion 924 of the roller tread 904. The central flange 906 may maintain positioning of links on the example track roller rim 900 by contacting interior surfaces of the links, rather than exterior surfaces of the links as shown in and described herein with respect to FIG. 4.

As shown in FIG. 9, the outer member 902 may include the central flange 906, such that the central flange 906 may be a portion of the roller tread 904. For example, the outer circumference 918 of the roller tread 904 in the central portion 924 of the roller tread 904 may be greater than the outer circumference 918 of the roller tread 904 at the first axial end 920 and the second axial end 922, where the central portion 924 of the roller tread 904 forms the central flange 906.

Figure 10:
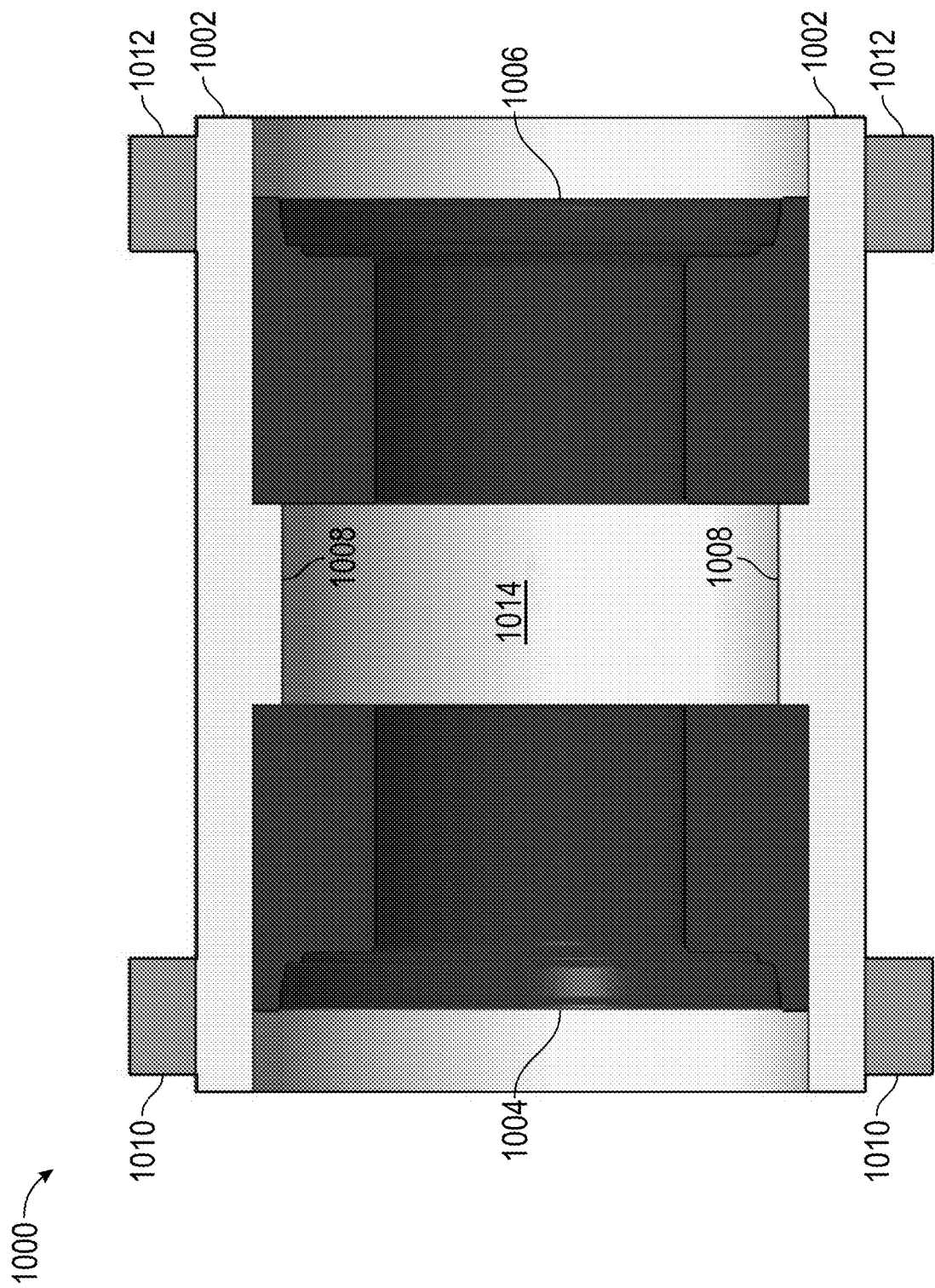
FIG. 10 is a cross-sectional view of an example track roller rim as described herein.

FIG. 10 is a cross-sectional view of an example track roller rim 1000 as described herein. As shown in FIG. 10, the example track roller rim 1000 may include a roller tread 1002 (e.g., an outer member), a first annular inner member 1004, a second annular inner member 1006, an inner tab 1008, a first flange 1010, a second flange 1012, and an oil cavity 1014.

The example track roller rim 1000 may be similar to the example track roller rim 500 shown in FIG. 5 and/or the example track roller rim 700 shown in FIG. 7, but the example track roller rim 1000 may not include the retaining ring 516 of the example track roller rim 500, the hole 520 of the example track roller rim 500, and/or the hole 718 of the example track roller rim 700. For example, the example track roller rim 1000 and/or the roller tread 1002 may include an annular configuration defining an axis of rotation, a radial direction, and a circumferential direction disposed about the axis of rotation similar to the annular configuration, the axis of rotation 522, the radial direction 524, and the circumferential direction 526 as described herein with respect to FIG. 5. Furthermore, the cross-sectional view of FIG. 10 may show the annular configuration more clearly than the diagrams of FIGS. 5-9.

As indicated above, FIGS. 1-10 are provided as examples. Other examples may differ from what was described in connection with FIGS. 1-10. For example, components of the example track roller rims described herein as being interference fit and/or components onto which other components are described herein as being interference fit may include knurled surfaces to increase friction.

The example track roller rims 500, 600 may include welds instead of the retaining rings 514, 516, 614, 616 to support the respective first flanges 510, 610, and/or the second flanges 512, 612. Additionally, or alternatively, the retaining rings 514, 516, 614, 616 may be welded onto the respective roller treads 502, 602, the first flanges 510, 610, and/or the second flanges 512, 612.

Furthermore, as used herein, references to steel may include carbon steel, alloy steel, stainless steel, tool steel, and/or the like. References to steel may also include steel that may or may not be heat-treated.

INDUSTRIAL APPLICABILITY

The example track roller rims 500, 600, 700, 800, 900, 1000 may be used with any machine utilizing a track roller and may be manufactured without complex forging of half rims, welding, and/or the like. For example, the example track roller rims 500, 600, 1000 may include components (e.g., the roller treads 502, 602, 1002, the first annular inner members 504, 604, 1004, the second annular inner members 506, 606, 1006, the first flanges 510, 610, 1010, the second flanges 512, 612, 1012, the first retaining rings 514, 614, the second retaining rings 516, 616, and/or the like) formed from tube stock steel, machined tube stock steel, and/or the like, which may be less expensive, complex, and/or the like than forged half rims.

As another example, the example track roller rims 700, 800, 900, 1000 may include components (e.g., the outer members 702, 802, 902, the roller tread 1002, the first annular inner members 710, 810, 908, 1004, the second annular inner members 712, 812, 910, 1006, and/or the like) formed from ring rolled forged steel and/or upset forged steel, tube stock steel, machined tube stock steel, and/or the like, which may be less expensive, complex, and/or the like than forged half rims. For example, the outer members 702, 802, 902 may be formed from ring rolled forged steel and/or upset forged steel, and the first annular inner members 710, 810, 908 and the second annular inner members 712, 812, 910 may be formed from machined tube stock steel.

The components may be interference fit together to form the example track roller rims 500, 600, 700, 800, 900, 1000 which may be less expensive, complex, and/or the like than welding half rims. Furthermore, the example track roller rims 500, 600, 700, 800, 900, 1000 may be manufactured without fasteners, such as bolts, which may fail or loosen.

Additionally, the example track roller rims 500, 600, 700, 800, 900, 1000 may be installed on a machine using components (e.g., a collar, shaft, and/or the like) similar to and/or the same as components used to install track roller rims having welded or forged half rims. For example, for example track roller rim 500, a bearing may be interference fit onto each of the first annular inner member 504 and the second annular inner member 506, and a shaft (e.g., similar to shaft 404 of FIG. 4) may be inserted along the axis of rotation. A collar may be installed at the first axial end and form a seal with the first annular inner member 504. Another collar may be installed at the second axial end and form a seal with the second annular inner member 506. The collar may secure the example track roller rim 500 to the shaft, which may extend from a track roller frame of an undercarriage assembly (e.g., the track roller frame 202 of the example undercarriage assembly 200 shown in FIGS. 2 and 3 and/or the like) of a machine (e.g. the example machine 100 shown in FIG. 1). The example track roller rim 500 may guide a track (e.g., the track 204 shown in FIG. 2) by contacting links (e.g., the links 220 shown in FIG. 2) of the track in a manner similar to that described with respect to FIG. 4.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the examples and/or implementations to the precise form disclosed. Modifications and variations may be made in light of the above disclosure or may be acquired from practice of the examples and/or implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A track roller rim, comprising:
an outer member including an annular configuration defining an axis of rotation, a radial direction, and a circumferential direction disposed about the axis of rotation,
wherein the outer member has an inner circumference, an outer circumference, a first axial end disposed along the axis of rotation, and a second axial end disposed along the axis of rotation;
a first annular inner member,
wherein the first annular inner member is interference fit within the inner circumference of the outer member at the first axial end, and
wherein the first annular inner member includes a first face oriented toward the first axial end,
wherein the first face forms a first dual cone seal at the first axial end; and
a second annular inner member,
wherein the second annular inner member is interference fit within the inner circumference of the outer member at the second axial end, and
wherein the second annular inner member includes a second face oriented toward the second axial end,
wherein the second face forms a second dual cone seal.

2. The track roller rim of claim 1, wherein the outer member comprises:
an inner tab positioned on the inner circumference of the outer member between the first annular inner member and the second annular inner member.

3. The track roller rim of claim 1, further comprising:
a first flange interference fit on the outer circumference of the outer member at the first axial end; and
a second flange interference fit on the outer circumference of the outer member at the second axial end.

4. The track roller rim of claim 3, wherein the outer member comprises:
an outer tab positioned on the outer circumference of the outer member between the first flange and the second flange.

5. The track roller rim of claim 3, comprising:
a first retaining ring positioned on the outer circumference of the outer member between the first flange and the first axial end; and
a second retaining ring positioned on the outer circumference of the outer member between the second flange and the second axial end.

6. The track roller rim of claim 1, wherein the outer member comprises a hole in fluid communication with an oil cavity formed by the outer member, the first annular inner member, and the second annular inner member.

7. The track roller rim of claim 1, wherein at least one of the outer member, the first annular inner member, or the second annular inner member is formed from tube stock steel.

8. The track roller rim of claim 1, wherein the outer member is a single, integral component formed without welding or other fasteners.

9. A track roller rim, comprising:
a roller tread having an inner circumference, an outer circumference, a first axial end disposed along an axis of rotation, and a second axial end disposed along the axis of rotation;
a first flange on the outer circumference of the roller tread at the first axial end;
a second flange on the outer circumference of the roller tread at the second axial end;
a first annular inner member, wherein the first annular inner member is interference fit within the inner circumference of the roller tread at the first axial end, and
wherein the first annular inner member includes a first face that forms a first dual cone seal at the first axial end; and
a second annular inner member,
wherein the second annular inner member is interference fit within the inner circumference of the roller tread at the second axial end, and
wherein the second annular inner member includes a second face that forms a second dual cone seal at the second axial end.

10. The track roller rim of claim 9, further comprising:
an inner tab positioned on the inner circumference of the roller tread between the first annular inner member and the second annular inner member.

11. The track roller rim of claim 9, wherein the roller tread comprises:
a central portion positioned between the first annular inner member and the second annular inner member,
wherein the outer circumference of the roller tread in the central portion is less than the outer circumference of the roller tread at the first axial end and the second axial end.

12. The track roller rim of claim 9, further comprising:
an outer tab positioned on the outer circumference of the roller tread between the first flange and the second flange.

13. The track roller rim of claim 9, wherein the roller tread comprises a hole in fluid communication with an oil cavity formed by the roller tread, the first annular inner member, and the second annular inner member.

14. The track roller rim of claim 9, wherein at least one of the first annular inner member, or the second annular inner member is formed from tube stock steel.

15. The track roller rim of claim 9, wherein the roller tread is formed from at least one of ring rolled forged steel or upset forged steel.

16. The track roller rim of claim 9, wherein the roller tread is a single, integral component formed without welding or other fasteners.

17. A track roller rim, comprising:
a roller tread having an inner circumference, an outer circumference, a first axial end disposed along an axis of rotation, a second axial end disposed along the axis of rotation, and a central portion between the first axial end and the second axial end;
a central flange on the outer circumference of the roller tread in the central portion;
a first annular inner member,
wherein the first annular inner member is interference fit within the inner circumference of the roller tread at the first axial end, and
wherein the first annular inner member includes a first face that forms a first dual cone seal at the first axial end; and
a second annular inner member,
wherein the second annular inner member is interference fit within the inner circumference of the roller tread at the second axial end, and
wherein the second annular inner member includes a second face that forms a second dual cone seal at the second axial end.

18. The track roller rim of claim 17, further comprising:
an inner tab positioned on the inner circumference of the roller tread between the first annular inner member and the second annular inner member.

19. The track roller rim of claim 17, wherein the roller tread is formed from at least one of ring rolled forged steel or upset forged steel.

20. The track roller rim of claim 17, wherein the roller tread is a single, integral component formed without welding or other fasteners.

* * * * *